M. M. WEISS.
CUSHION TIRE FOR VEHICLE WHEELS.
APPLICATION FILED NOV. 21, 1910.
1,040,074.
Patented Oct. 1, 1912.
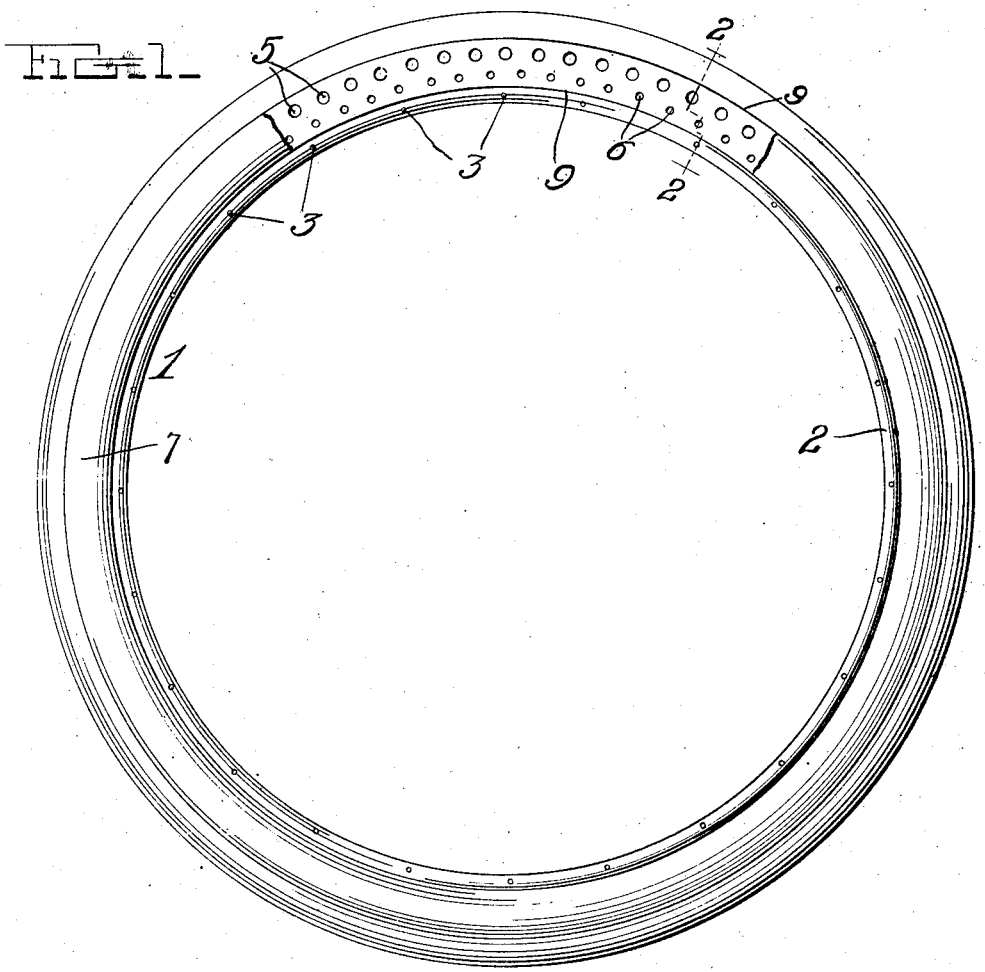
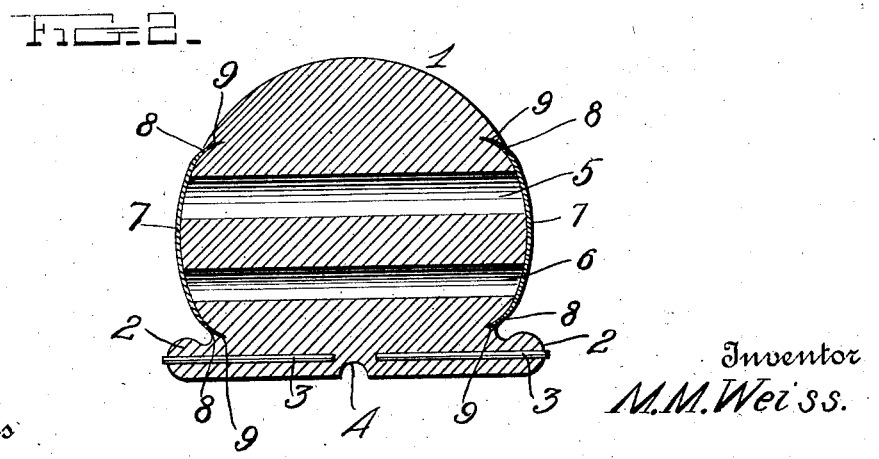
Inventor
M. M. Weiss.

UNITED STATES PATENT OFFICE.

MICHAEL M. WEISS, OF DETROIT, MICHIGAN.

CUSHION-TIRE FOR VEHICLE-WHEELS.

1,040,074.

Specification of Letters Patent.

Patented Oct. 1, 1912.

Application filed November 21, 1910. Serial No. 593,453.

*To all whom it may concern:*

Be it known that I, MICHAEL M. WEISS, a citizen of the United States, residing at Detroit, in the county of Wayne and State of Michigan, have invented certain new and useful Improvements in Cushion-Tires for Vehicle-Wheels; and I do declare the following to be a full, clear, and exact description of the invention, such as will enable others skilled in the art to which it appertains to make and use the same.

This invention relates to improvements in cushion tires for vehicle wheels.

One object of the invention is to provide a cushion tire which will be practically puncture-proof, but which will possess substantially the same amount of resiliency or elasticity as a pneumatic tire.

Another object is to provide a tire of this character which will be simple, strong, durable, and inexpensive in construction, efficient and reliable in operation, and which may be readily applied and secured to any form of clencher rim.

With these and other objects in view, the invention consists of certain novel features of construction, combination and arrangement of parts as will be more fully described and particularly pointed out in the appended claim.

In the accompanying drawings:—Figure 1 is a side view of my improved tire, parts of the same being broken away; and, Fig. 2 is a cross sectional view on the line 2—2 of Fig. 1.

Referring more particularly to the drawings, 1 denotes my improved tire which is formed of rubber composition or other material having the required resiliency or elasticity. The tire may be of any suitable cross sectional shape and is here shown as being of substantially oval form and as having on its inner side laterally projecting annular flanges 2, formed integral with and of the same material as the tire, whereby the tire is attached to the rim of the wheel in the usual manner. The flanges 2 are provided to permit the clenching members of the wheel rim to obtain a firm grip on the tire and thus securely fasten the same to the wheel.

Arranged at intervals through the base portion of the tire and through the side flanges thereof are a series of reinforcing rods 3 which are provided to impart the proper rigidity or stiffness to the inner portion of the tire so that the latter will be firmly held by the clenching devices of the rim. In the center of the base portion of the tire between the inner ends of the reinforcing rods 3 is formed an annular groove 4 which is provided to enable the base portion of the tire to more readily conform to the shape of the channel in the frame of the wheel.

Arranged through the rim is an outer series of transversely disposed passages 5 and an inner series of similar passages 6 intersecting the former. The passages 5 and 6 are spaced apart at suitable intervals and the outer passages 5 are preferably of greater diameter than the inner passages and are arranged opposite to the spaces between the inner passages. The passages 5 and 6 are provided to impart resiliency or elasticity to the tire and said passages may be of greater or less size and spaced to a greater or less distance according to the weight of the vehicle to be supported thereby, or the amount of resiliency required. The passages 5 and 6 may be bored through the tire after the latter is formed or may be molded therein during the forming of the tire.

The opposite ends of the passages 5 and 6 open through the opposite sides of the tire and the open ends of the passages are preferably covered by flexible covering strips 7 formed of rubber or other flexible or elastic material. The cover strips 7 have their inner and outer edges tapered as shown at 8 and said tapered edges are engaged with correspondingly shaped annular slits 9 formed in the opposite sides of the tire beyond the inner and outer rows of passages. The tapered edges of the strips are preferably cemented or otherwise firmly secured in the slits 9 and when so arranged the cover strips close the open ends of the passages and thus prevent the entrance of dirt or other foreign matter which might interfere with the proper operation of the tire. Because of the flexible nature of the cover strips 7 the latter will give in any direction when the tire is depressed or expanded, and therefore will not interfere with the resilient action of the tire.

It is to be observed that the opposite tapered edges of the covering strip are only cemented to the tire, whereby the intermediate portions cover the passages in the tire but are detached therefrom, thus hermetically sealing the passages without detracting from the resiliency of the tire.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention what I claim is:

A cushion tire for vehicle wheels constructed of solid resilient material, having inner and outer series of transverse extending passages of different diameters, the inner ones being arranged opposite to the spaces between the outer ones, said tire provided with a plurality of curved slits formed in the opposite sides of the tire, and flexible strips having tapering opposite ends cemented within the slits and over the tire and also over the open ends of the passages.

In testimony whereof I have hereunto set my hand in presence of two subscribing witnesses.

MICHAEL M. WEISS.

Witnesses:
JAMES H. RICHARDS,
L. S. PERRY.

Copies of this patent may be obtained for five cents each, by addressing the "Commissioner of Patents, Washington, D. C."